(12) United States Patent
Döttling et al.

(10) Patent No.: US 8,588,089 B2
(45) Date of Patent: Nov. 19, 2013

(54) MECHANISM FOR AUTOMATED RE-CONFIGURATION OF AN ACCESS NETWORK ELEMENT

(75) Inventors: Martin Döttling, Neubiberg (DE); Michael Färber, Wolfratshausen (DE); Andreas Lobinger, Grafing (DE); Jürgen Michel, Munich (DE); Bernhard Raaf, Neuried (DE); Ingo Viering, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 449 days.

(21) Appl. No.: 12/933,109

(22) PCT Filed: Mar. 18, 2009

(86) PCT No.: PCT/EP2009/053203
§ 371 (c)(1),
(2), (4) Date: Dec. 17, 2010

(87) PCT Pub. No.: WO2009/115554
PCT Pub. Date: Sep. 24, 2009

(65) Prior Publication Data
US 2011/0096687 A1   Apr. 28, 2011

(30) Foreign Application Priority Data
Mar. 19, 2008  (EP) .................................. 08153012

(51) Int. Cl.
*G08C 15/00* (2006.01)
(52) U.S. Cl.
USPC .......................................................... 370/252

(58) Field of Classification Search
None
See application file for complete search history.

(56) References Cited

U.S. PATENT DOCUMENTS

| 2004/0198234 A1* | 10/2004 | Wacker et al. ............. 455/67.13 |
| 2005/0182959 A1* | 8/2005 | Petry et al. ..................... 713/200 |
| 2008/0004028 A1* | 1/2008 | Vincent ......................... 455/446 |

FOREIGN PATENT DOCUMENTS

| WO | WO 98/26614 | 6/1998 |
| WO | WO 98/57516 | 12/1998 |
| WO | WO 02/07464 A1 | 1/2002 |
| WO | WO 2005/060287 A1 | 6/2005 |

OTHER PUBLICATIONS

3G Americas, "Data Optimization—Coverage Enhancements to Improve Data Throughput Performance", Oct. 2006, 52 pages.

* cited by examiner

*Primary Examiner* — Jianye Wu
(74) *Attorney, Agent, or Firm* — Harrington & Smith

(57) ABSTRACT

A mechanism for controlling resources and/or settings of an access network element like a base station is provided which allows an autonomous reconfiguration of, for example, the antenna configuration based on a set of performance indicators in a base station. The base station can reconfigure itself without the need of operator control so that during periods with low capacity demands the base station will reconfigure correspondingly, which may include a reduction of active cells by turning off the power for a part of the installed equipment.

64 Claims, 6 Drawing Sheets

MECHANISM FOR AUTOMATED RE-CONFIGURATION OF AN ACCESS NETWORK ELEMENT

BACKGROUND OF THE INVENTION

1. Field of the Invention

The present invention relates to an improved mechanism for re-configuring resources and/or component settings of an access network site. In particular, the present invention relates to a method providing an improved re-configuration procedure for resources and/or component settings, such as antenna configurations and power amplifier settings of an access network element by means of a controller, e.g. a self-organizing network (SON) entity, in cellular communication systems, like 3GPP Long-Term Evolution (LTE).

For the purpose of the present invention to be described herein below, it should be noted that

- an access network element or site may for example be any device by means of which a user may access a communication network; this implies mobile as well as non-mobile or fixed devices and networks, independent of the technology platform on which they are based; only as an example, it is noted that access network elements operated according to principles standardized by the $3^{rd}$ Generation Partnership Project 3GPP, and known for example as LTE-based network elements like an enhanced Node B (eNB), are suitable for being used in connection with the present invention;
- when reference is made herein to a call or communication connection, this exemplifies only a general example of a connection of any content; content as used in the present invention is intended to mean data of at least one of audio data (e.g. speech), video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or WiMax, took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), the IEEE (Institute of Electrical and Electronics Engineers) and the like are working on standards for telecommunication network and access environments.

With the emergence of packet-based wireless broadband systems such as WiMAX, also other systems like the Universal Mobile Telecommunications System (UMTS) is developed further to cope with increasing performance demands. As one example, the Long Term Evolution (LTE) of the UMTS Terrestrial Radio Access and Radio Access Network is under development. Goals for the evolved system include support for improved system capacity and coverage, high peak data rates, low latency, reduced operating costs, multi-antenna support, flexible bandwidth operations and seamless integration with existing systems.

For future wireless networks, such as 3GPP Long-Term Evolution (LTE) based networks, it is tried to reduce total cost of ownership for the operators. For this purpose, for example, automated configuration and optimization procedures are developed.

Generally, a communication network and in particular a mobile communication network needs to be dimensioned for the peak traffic, i.e. for situations where the performance demand for transmission resources, number of subscribers, occupied bandwidth and the like is highest. On the other hand, during other times different to peak traffic times, resources such as air interface capacity remains unused. An example for this is a situation where the typical load in traffic has a peak during daytime and is very low during night. Further examples may include for example largely varying traffic load in public places, such as fairs, stations, etc., depending on exhibitions and operating hours.

One problem arising from this situation is unnecessary energy consumption. Even a 0% loaded base station or transmitter consumes still a considerable amount of the power, compared to a fully loaded one. The reason is that several elements therein require the same level of power, irrespective of the output power. Examples for such elements in a base station or the like are modulators, signal generators, D/A converters, filters, control circuitry etc.

Current approaches for solving this problem propose to switch off complete cells for energy savings reasons. However, this would have a severe impact on the coverage as well as on adjacent cells' load and coverage area. As a consequence thereof, it may be necessary to change power and antenna tilt in the adjacent cells.

Traditionally a fixed number of sectors are deployed on a base station site. Any change in sectorization is done manually by technicians replacing hardware and the corresponding manual updates in OAM (Operation, Administration and Maintenance) data bases. This requires a time consuming and also expensive work of personnel.

On the other hand, there is available or currently under development equipment providing higher order sectorization and antennas or antenna arrays with electronically adjustable azimuth half-power beamwidth. This is achieved, for example, by electronic beamforming, as described for example in 3G Americas, "Data Optimization—Coverage Enhancements To Improve Data Throughput Performance".

It is to be expected that such equipment will be increasingly used in future for access network elements of communication networks.

SUMMARY OF THE INVENTION

Thus, it is an object of the invention to provide a possibility to reduce costs for an operating access network site, for example by reducing the energy consumption. In particular, it is an object of the invention to provide an improved mechanism for re-configuring resources and/or component settings of an access network site in a cost effective manner.

This object is achieved by the measures defined in the attached claims.

According to one aspect of the proposed solution, there is provided, for example, a method comprising determining a performance demand condition of a target site of an access network element, deciding on a re-configuration pattern for the target site based on the performance demand condition, and sending an instruction indicating the re-configuration pattern to the target site.

In addition, according to one aspect of the proposed solution, there is provided, for example, an apparatus comprising a determiner configured to determine a performance demand condition of a target site of an access network element, a decider configured to decide on a re-configuration pattern for the target site based on the performance demand condition, and a transmitter configured to send an instruction indicating the re-configuration pattern to the target site.

According to further refinements, the above defined method and apparatus according to the proposed solution may comprise one or more of the following features:

the determination of the performance demand condition of the target site may comprise acquiring information about at least one of a cell load statistic, overload and/or resource information of neighboring cells, overload and/or resource information of sectors of the target site, preset time scheduling information, and predetermined event trigger information, and processing the acquired information for determining presence of a trigger condition for re-configuring the target site;

the decision on a re-configuration pattern may comprise selecting of one preset re-configuration pattern, wherein the preset re-configuration pattern comprises at least one pattern for a high load state and at least one pattern for a low load state;

the decision on a re-configuration pattern may comprise generating parameters indicating at least one of setting at least one power amplifier of the target site to be turned off/on, re-configuring antenna patterns of the target site, adjusting azimuth beampatterns of the target site, setting sectors of the target site to be turned off/on, setting antennas of the target site to be turned off/on, and setting a sweep operation of an azimuth beampattern for a time multiplex coverage of the target site; optionally, the decision on a re-configuration pattern may further comprise generating parameters indicating at least one of setting a gradual reduction of a transmit power of dedicated sectors before executing another re-configuration, and adjusting a transmit power of dedicated sectors after executing the re-configuration;

a permission for a re-configuration of the target site may be requested from a network control element, wherein the transmission of the instruction indicating the re-configuration pattern for the target site may be performed when an acknowledgement for the requesting of the permission is received;

information about an actual configuration of the target site may be received;

information about the re-configuration of the target site may be sent to another access network site, wherein the another access network site is a neighboring site to the target site;

the transmitted information may comprise at least one of an indication of deactivated cells or sectors of the target site, an information indicating an adjusted capacity of the target site after the re-configuration, an information about non-covered areas related to the target site, and an information regarding a sweep operation of an azimuth beampattern for a time multiplex coverage of the target site;

the measures described above may be implementable in a self-organizing network entity;

the measures described above may be implementable in at least one of the target site and a neighboring site, or the measures described above may be implementable in an access network control element, or the measures described above may be implementable in a network element for operation, administration and maintenance.

According to a further aspect of the proposed solution, there is provided, for example, a method comprising receiving an instruction indicating a re-configuration pattern, processing the re-configuration pattern, and changing a configuration of resources according to the processing result of the re-configuration pattern.

In addition, according to one aspect of the proposed solution, there is provided, for example, an apparatus comprising a receiver configured to receive an instruction indicating a re-configuration pattern, a processor configured to process the re-configuration pattern, and a changer configured to change a configuration of resources according to the processing result of the re-configuration pattern.

According to further refinements, the above defined method and apparatus according to the proposed solution may comprise one or more of the following features:

configuration information indicating a current configuration may be transmitted to a configuration control element, said configuration information comprising at least one of antenna configuration information, sector configuration information, a number of sectors, a cell identification, and a transmit power value for reference signal and data transmission;

performance demand information related to a performance demand condition may be transmitted to a configuration control element, said performance demand information comprising at least one of a cell load statistic, overload and/or resource information of sectors, and predetermined event trigger information;

processing of the re-configuration pattern may comprise detecting of changes of parameters of resources from the re-configuration pattern, wherein the re-configuration pattern may comprise a pattern for a high load state or a pattern for a low load state;

processing of the re-configuration pattern may further comprise acquiring parameters indicating at least one of setting at least one power amplifier to be turned off/on, re-configuring antenna patterns, adjusting azimuth beampatterns, setting sectors to be turned off/on, setting antennas to be turned off/on, and setting a sweep operation of an azimuth beampattern for a time multiplex coverage; optionally, processing of the re-configuration pattern may further comprise acquiring parameters indicating at least one of setting a gradual reduction of a transmit power of dedicated sectors before executing another re-configuration, and adjusting a transmit power of dedicated sectors after executing the re-configuration;

information about an actual configuration may be sent after performing the re-configuration to at least one of a configuration control element and a neighboring access network element;

the information may comprise at least one of an indication of deactivated cells or sectors, an information indicating an adjusted capacity after the re-configuration, an information about non-covered areas, and an information regarding a sweep operation of an azimuth beampattern for a time multiplex coverage;

the measures described above may be implementable in an access network element.

According to a further aspect of the proposed solution, there is provided, for example, a method comprising receiving information indicating a re-configuration of a neighboring site, processing the information, and adapting an internal setting in accordance with the processing result of the received information.

In addition, according to one aspect of the proposed solution, there is provided, for example, an apparatus comprising a receiver configured to receive information indicating a re-configuration of a neighboring site, a processor configured to process the information, and an adjuster configured to adapt an internal setting in accordance with the processing result of the received information.

According to further refinements, the above defined method and apparatus according to the proposed solution may comprise one or more of the following features:

information about the re-configuration may be received from at least one of a configuration control element and a neighboring access network element;

the information may comprise at least one of an indication of deactivated cells or sectors, an information indicating an adjusted capacity after the re-configuration, an information about non-covered areas, and an information regarding a sweep operation of an azimuth beampattern for a time multiplex coverage;

the adapting of settings may comprise at least one of updating a neighbor cell list, adjusting of at least one of handover and load balancing parameters, and adjusting of paging procedure settings.

performance demand information related to a performance demand condition may be transmitted to a configuration control element, said performance demand information comprising at least one of a cell load statistic, overload and/or resource information of sectors, and predetermined event trigger information;

a trigger signal for initializing a further re-configuration of the neighboring site for which the information indicating the re-configuration was received may be transmitted;

the measures described above may be implementable in an access network element.

Still further, according to one aspect of the proposed solution, there is provided, for example, a computer program product for a computer, comprising software code portions for performing the steps of the above defined methods when said product is run on the computer; the computer program product may comprise a computer-readable medium on which said software code portions are stored; also, the computer program product is directly loadable into the internal memory of the computer.

By virtue of the proposed solutions, it is possible to achieve several advantages.

The general principle of the proposed mechanism can be easily implemented in future radio standards, or applied to updates of existing radio standards. Furthermore, the proposed mechanism can be flexibly adapted to different network architecture types. For example, depending on the mapping of logical nodes to physical nodes, the entities defined by the invention can be separately provided or variously combined in one or more network elements, wherein the signaling may take place either internally or on varying types of interfaces. For example, the entity referred to as the configuration control element or SON entity may be a separate node or combined with either a target site (an access network element) or an OAM entity.

Furthermore, a lower energy consumption of an access network site can be achieved by the proposed mechanism. In detail, by adapting resource settings such as the antenna configuration and sectorization of an access network element taking into account a current traffic load, it is possible to minimize network energy consumption and improve lifetime of equipment. This means that it is possible by means of the invention to save operational costs in times and areas with low load by re-configuring access network sites and thus to minimize energy consumption while on the other hand a sufficient coverage and service is still provided for subscribers. For example the present invention enables to switch off e.g. half of the transmitters instead of operating all transmitters at half power which is more energy efficient.

The invention is in particular, but not exclusively, useful for an employment in systems according 3GPP, NGMN (Next Generation Mobile Network) which is an association of leading mobile network operators. Furthermore, it is also useful in connection with corresponding research programs, such as SOCRATES (Self Optimization/Self Configuration in Wireless Networks).

In particular, by employing the mechanism according to the invention, it is possible to achieve a self-optimizing cell configuration providing a reduced OPEX (operating expenditures) by saving energy due to switching off HPAs (High Power Amplifiers) in low load situations. Also reduced operational hours of HPAs are achieved leading to longer lifetime, reduced number of failures, and therefore additionally reduced OPEX and CAPEX (capital expenditures). Furthermore, the switching off of antennas and the reduced transmit power leads to less emitted power providing further savings due to reduced induced interference in the system (e.g. neighbor cells).

It is also to be noted that the awareness of environmental impacts of network operation becomes an integral part of market differentiation strategies and corporate responsibility of both vendors and operators. Due to the lower power consumption and the reduced emitted power such environmental considerations are promoted.

As another advantage the present invention provides a simple and easily adaptable algorithm. In particular, sectorization of cells is advantageously adapted to traffic condition so that several gains of more advanced schemes, like user-specific beamforming, are obtainable with a simple algorithm.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, an example of an application in a system according to 3GPP specifications for LTE is described. However, it is to be noted that embodiments of the present invention are not limited to an application in such a system or environment but are also applicable in other network systems, connection types and the like, for example in networks according to other 3GPP specifications, IEEE specifications, or the like.

A basic system architecture of a communication network may comprise a commonly known architecture of a wired or wireless access network subsystem. Such an architecture comprises one or more access network control units, radio access network elements or base stations, with which a terminal device as a user equipment is capable to communicate via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between terminals and network elements.

Furthermore, access network element, the configuration control element or SON entity and the OAM entity as well as their respective functions as described herein may be implemented by software, e.g. by a computer program product for a computer, or by hardware. In any case, for executing their respective functions, correspondingly used devices, such as network element like a base transceiver station, a Node B, and enhanced Node B (eNB), a SON entity and the like may comprise several means and components (partly not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
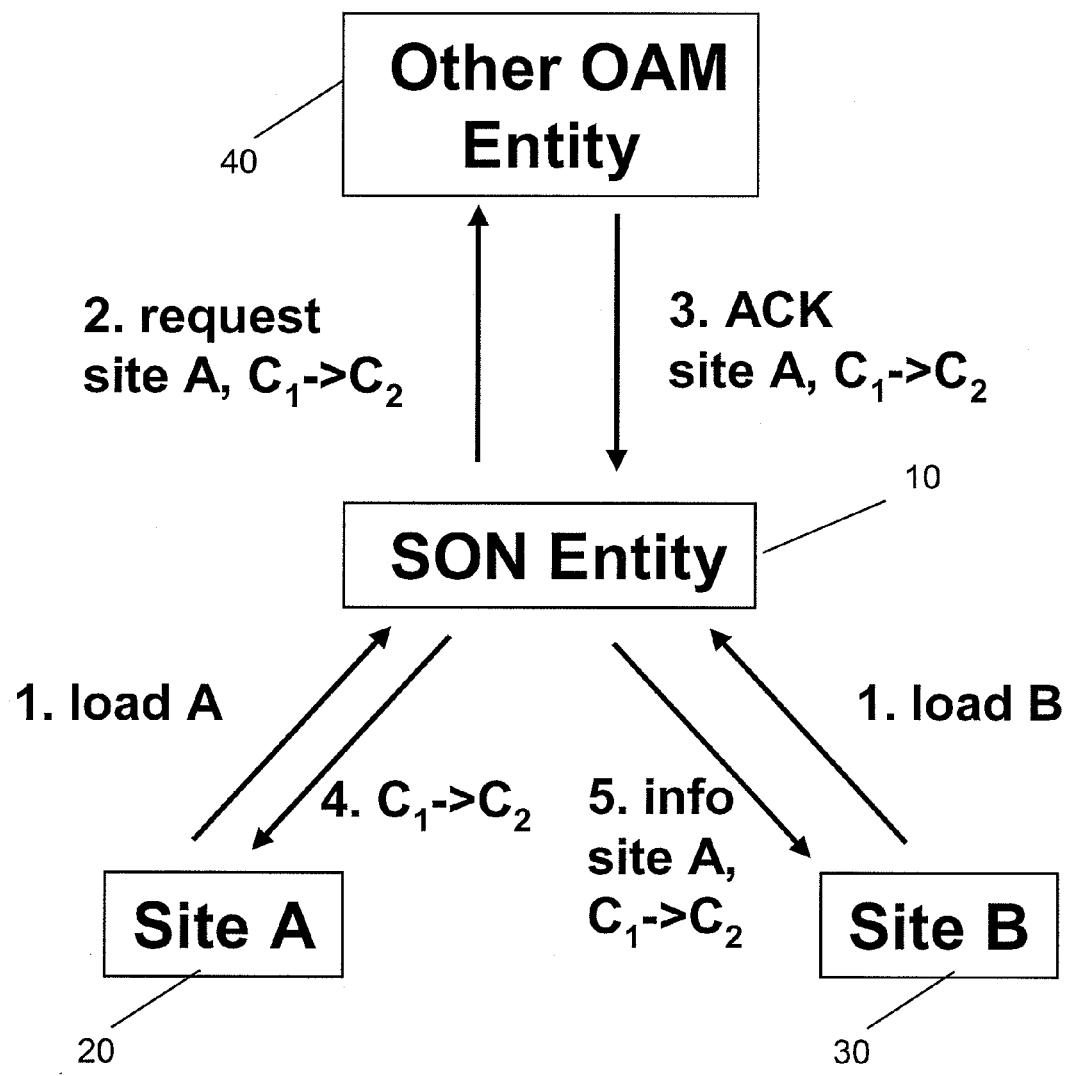
FIG. 1 shows a diagram indicating network elements executing a re-configuration procedure according to an example of an embodiment of the invention.

FIG. 1 shows a diagram indicating network elements executing a re-configuration procedure according to an example of an embodiment of the invention.

FIG. 1 shows a simplified block diagram of an architecture of a communication network to which the present invention is applicable, i.e. only those elements are depicted which are useful for understanding the principles of the invention. As depicted in FIG. 1, an example based on the 3GPP specifications for LTE is selected. However, it is to be noted that also other network systems can use the principles defined below, for example another 3GPP based network, a WLAN and the like, or network systems developed in the future and having similar basic functionalities. The respective network elements comprised by such network systems are generally known by those skilled in the art so that a detailed description thereof is omitted herein for the sake of simplicity. Furthermore, it is to be noted that the functional architecture can be designed into various hardware configurations rather than fixed configurations.

In detail, FIG. 1 illustrates an example of the signaling sequence and involved entities for an automated cell re-configuration. It is to be noted that all entities are logical nodes and may, dependent on the actual implementation requirements, be separate elements or (partly) located in the same physical node. Depending on the mapping of the logical nodes to physical nodes, the signaling may thus take place either internally or on varying type of interfaces.

According to FIG. 1, the network comprises two access network elements 20 and 30 such as base stations or eNBs. To these access network elements 20 and 30, subscribers may be connected for establishing communication connections which is not shown in FIG. 1 for the sake of simplicity. In the following it is assumed that the access network element 20 represents a target site A for the re-configuration, while the access network element 30 represents a neighboring site B. Furthermore, it is to be noted that more than two access network elements may be part of the network and involved in the described re-configuration procedures.

In addition, a SON entity 10 is provided which functions as a configuration control element. The SON entity is connected via corresponding interfaces or links to the respective access network elements, or may be part thereof. Moreover, a OAM entity 40 may be provided which may communicate with the SON entity 10.

Basically, according to an example of an embodiment of the invention, the re-configuration of the target site's A (20) resources and/or settings is accomplished by using a controller, i.e. the SON entity 10, which executes procedures allowing an autonomous re-configuration of, for example, the antenna configuration. This re-configuration is based on at least one performance demand condition parameters, for example a set of performance indicators in the target site A access network element 20 and optionally also in the (one or more) neighboring site B access network element 30. For example there is provided a procedure allowing to combine abilities to disable equipment, such as power amplifiers of the target site A, and to re-configure antenna patterns of the target site A, wherein the re-configuration steps to be executed may be summarized in a re-configuration pattern. A corresponding instruction indicating the re-configuration pattern is then sent to the target site A. Alternatively, the instruction may trigger a predetermined re-configuration pattern stored in the target site for execution thereof. The access network element 20 (the target site) is then able to reconfigure itself on the basis of a corresponding instruction/the re-configuration pattern, without the need of operator control.

As an example for the effect of such a re-configuration, the following case may be assumed. During periods with low capacity demands the access network element 20 may reconfigure itself, which allows, for example, a reduction of active cells (e.g. by turning off the power for a part of the installed equipment). This results in a significant reduction of primary power consumption. For example, if a cell is configured with 6 way sectorization during peak hours, it can be reconfigured to 3 sectors during off-peak hours—This allows to switch off half the transmitters, while the other half covers twice the area (or angle, as the beamwidth of their antennas is increased).

With reference to FIG. 1, the configuration messages, procedures and signaling to be able to operate such sites having, for example, a varying number of sectors or antenna configuration in a cellular network are described.

It is assumed that the access network element 20 as the target site A for the re-configuration has C1 antennas wherein this fact as well as sector configurations of the target site A are defined and known/controlled by the SON entity 10.

As an illustrative example for an implementation not limiting the general concept of the invention, it may also assumed taking into account a respective load situation (i.e. a high load or a low load situation) it is possible to switch between two configurations, one for low load and one for high load within the LTE network, e.g. every second sector of a 6-sector site is switched off and remaining 3 sectors azimuth half-power beamwidth is adjusted to that of a 3-sector site. A further possibility is to switch from multi-antenna transmission to single antenna transmission in individual or all sectors.

The configuration data of a remotely adjustable antenna/sector configuration of sites may comprise at least one of the following: information regarding antenna and sector configuration of the target site A to be re-configured; information about the number of sectors, their cell ID's, and the transmit power used for reference signals and data; and information about the azimuth coverage since the complete azimuth coverage is to be maintained by all site configurations. The maintenance of the complete azimuth coverage is achievable, for example, by use of varying azimuth beampatterns, which may be either implemented by electronic control of sector antennas supporting this feature, or by changing the number of transmitting elements and effecting a proper adjustment of the beamforming weights of multiple antenna elements suitable for beamforming.

It is to be noted that it may also be possible to consider, in a more advanced set-up, configurations where only a partial coverage may be allowed. As another option, also configurations may be considered where beams are swept in the azimuth plane in order to provide coverage in a time-multiplex fashion.

In a step 1 indicated in FIG. 1, the site A (as well as the site B) informs the SON entity 20 about performance demand conditions thereof, e.g. by transmitting information indicating the current load statistic or the like. These performance demand conditions are used by the SON entity 10 to decide on the need for a re-configuration of the target site A. In other words, the performance demand condition information represent a trigger for instructing the re-configuration of the site A.

Such triggers for changing a site configuration, i.e. for entering, for example, a low load site configuration may include at least one of following events/information: cell load statistics of the target site A, an overload indicator and/or resource information of neighboring cells (received, for example, from the site B), an overload indicator and/or resource information of other sectors of the target site A, time schedule information based on pre-adjusted time schedules (for example, corresponding time schedule information may be based on OAM traffic load statistics, which may indicate that typically starting from a specific day time (such as 7:00 am) an increase of load can be predicted in the area), other individual trigger information, for example due to maintenance reasons etc.

It is to be noted that the information indicated above used for indicating the performance demand condition of the respective site A/B may be determined on basis of procedures known to the person skilled in the art, so that a description thereof is omitted herein.

In the example, shown in FIG. 1, the message in step 1 sends information indicating to the SON entity 10 that a trigger for the re-configuration of the target site A is present. For example, it is determined by the SON entity 10 on basis of the received information that the load of the target site (or specific sectors thereof) falls below a certain threshold for a certain period of time. Furthermore, it is detected that there are low load situations in neighboring cell(s) (i.e. site B), wherein a transmission of the information from the neighboring site B may be triggered by sending a resource status request to it. It is also possible, for example, that a pre-adjusted schedule using OAM traffic load statistics is used as a trigger, for example since it is known that typically during night time there is low load.

When the trigger for the re-configuration of the target site A is recognized in the SON entity 10, it controls a configuration change of the target site A. For example, a re-configuration pattern is determined to be used for the re-configuration in accordance with the performance demand condition determined on the basis of the information received from the access network elements 20 and 30. Alternatively, it may also be determined that for example a low load situation is present and a corresponding instruction is sent to the target site A triggering a change of the configuration according to a predetermined re-configuration pattern whose parameters may be stored in the target site A.

According to an example of an embodiment of the invention, the configuration change procedure which is instructed by the SON entity 10 by means of the instruction/re-configuration pattern may include at least one of following settings: adapting an antenna configuration during the configuration change, for example in times with low traffic load in access network element 20 with N (e.g. 6) sectors k (e.g. 3) sectors out of the N sectors are switched off, or are operated with less antennas; adapting azimuth pattern of the antennas so as to ensure that complete coverage of the cell (site A) is maintained; optionally, gradually reducing of a BCH (Broadcast Channel) transmit power of other sectors before switching the associated sector off so as to trigger and enable successful and gradual handover of attached subscribers to the neighboring sector; additionally, adapting the transmit power of a remaining sector so as to improve coverage in a side lobe area of the beampattern thereof.

In the implementation example discussed in connection with FIG. 1, for example, the SON entity 10 may instruct, for example, to gradually decrease the BCH power of every second sector while at the same time increasing the azimuth beamwidth of the remaining sectors. In other words, the SON entity 10 instructs to reduce the number of antennas to be used for transmission in the target site A from C1 to C2.

In a step 2 indicated in FIG. 1, an optional request for permission for performing the re-configuration is sent from the SON entity 10 to a further OAM entity 40. This request may be necessary to inform the OAM entity about the proposed change in the cell configuration of the target site A. The OAM entity 40 may check whether there are any circumstances which might prevent a change due to reasons not known to the target site or the SON entity 10, e.g. reasons related to the network status.

It is to be noted that the OAM entity 40 may also be informed after effecting the re-configuration of the target site A about the effected change in the cell configuration. This may be effected, for example, in order to allow collecting separate statistics per cell configuration, to prevent erroneous fault management activity and to enable to trigger re-activation of switched off sectors (i.e. to re-change the configuration to high load mode) due to OAM reasons.

According to the example of FIG. 1, it is assumed that there are no reasons from OAM perspective to prevent the change. Thus, in step 3, the SON entity 10 receives a positive feedback in form of an acknowledgement that the target site A may be re-configured from a C1 mode to a C2 mode, for example.

Afterwards, in step 4, the SON entity instructs the change of the target site A's configuration according to the decided re-configuration patter, i.e. to change from the C1 mode to the C2 mode. Hence, according to the implementation example illustrated in FIG. 1, the target site A is instructed to shut off every second sector and to enforce other settings according to the re-configuration pattern (e.g. adjusting azimuth beampatterns, initiating a sweep mode or the like).

The SON entity 10 is informed about the re-configuration of the target site A, i.e. the actual configuration of the target site A after enforcing the re-configuration pattern is reported to the SON entity 10.

In step 5, the neighboring site B (access network element 30) is also informed, for example by the SON entity 10, about the new configuration. It is to be noted that it is also possible according to another example of the embodiment of the invention to inform the neighboring site B by a signaling from the target site A. In any case, the neighboring site B is enabled to adjust internal settings according to the effected change of the target site A's resources and settings.

The information transmitted to the SON entity 10 and/or the neighboring site B regarding the re-configuration of the target site A may comprise at least one of the following: indicating de-activated cells in order to prevent erroneous interpretation in neighboring cells especially in a multi-vendor environment, for example if neighboring cells request a resource status report (otherwise, for example, unnecessary measurements and erroneous fault detection might occur); indicating an adjusted capacity of the target site A, for example adjusted thresholds for overload indication are to be sent to the neighboring cells in case a resource status request is answered by reporting PRB usage and overload is deduced at the reception of a PRB (Physical Resource Block) usage; optionally, informing about areas (or directions) of the target site A which are not covered, in case of a configuration where also only part coverage is enabled; optionally, informing about a sweeping time and/or information about the typical time interval between consecutive coverage of one area in case configurations with sweeping beams are used.

The information received by the neighboring site in step 5 may be used for several purposes, which may comprise at least one of the following.

The neighbor cell list may be updated accordingly thus improving efficiency of measurements and handover. Furthermore, handover procedures and load balancing parameters may be adjusted in order to take the limited capacity of the target site A's cell into account, so that, for example, users may be served longer by the other cells.

In addition, the neighboring cells may become aware of the configuration and may thus issue predetermined triggers to the SON entity for initializing a further (e.g. re-) change of the target site A's configuration, for example in cases where the neighboring site encounters significant load changes in its cells.

Moreover, paging procedures may be optimized when knowing the changed status of the target site A.

In cases where also an only partial coverage is maintained, in particular the adjacent cells of this area may be informed thereabout. By means of this, it is possible to set re-activation triggers accordingly and provide timely requests for re-activation.

On the other hand, in cases where sweeping beam configurations are used, the neighboring sites may be informed accordingly so that terminals may adapt timers and access attempts accordingly. Thus, probability to transmit during times of coverage is improved while abandoning connection/transmission attempts too early may be prevented. It is to be noted that the target site A may inform terminals connected to it accordingly for corresponding improvement of the transmit probability and the like.

Thus, according the implementation example illustrated in FIG. 1, the neighboring site B may update, for example, the neighbor cell list and know that less capacity is available in the site A which switched to low load configuration.

It is to be noted that different to the example shown in FIG. 1 there may be more than one target site A to be reconfigured in a network. Furthermore, there may be also more than one neighboring site B. The measures described above for the case of respective one target and neighboring site can be easily adapted to a higher number of sites, as is obviously derivable for the person skilled in the art.

Even though not explicitly depicted in FIG. 1, the procedure for the re-configuration may also comprise the case where the configuration of the target site A is to be changed from the low load mode to the high load mode (i.e. the switched off sectors are to be reactivated, the antennas are to be increased from C2 to C1, and the like). For example, when some time elapses in the low load mode, the capacity demand condition of the sites A and/or B may indicate that the load increases. In other words, for example, the own load increases again and exceeds a predefined threshold for a certain period of time wherein also statistics may indicate that typically at this time the load will continue to increase. The SON entity 10 may therefore start again the cell re-configuration process, possibly again including the feedback of further OAM entities 40. As a result, a high load configuration may be applied wherein the SON entity 10 and neighboring cells 30 are informed accordingly.

Figure 2:
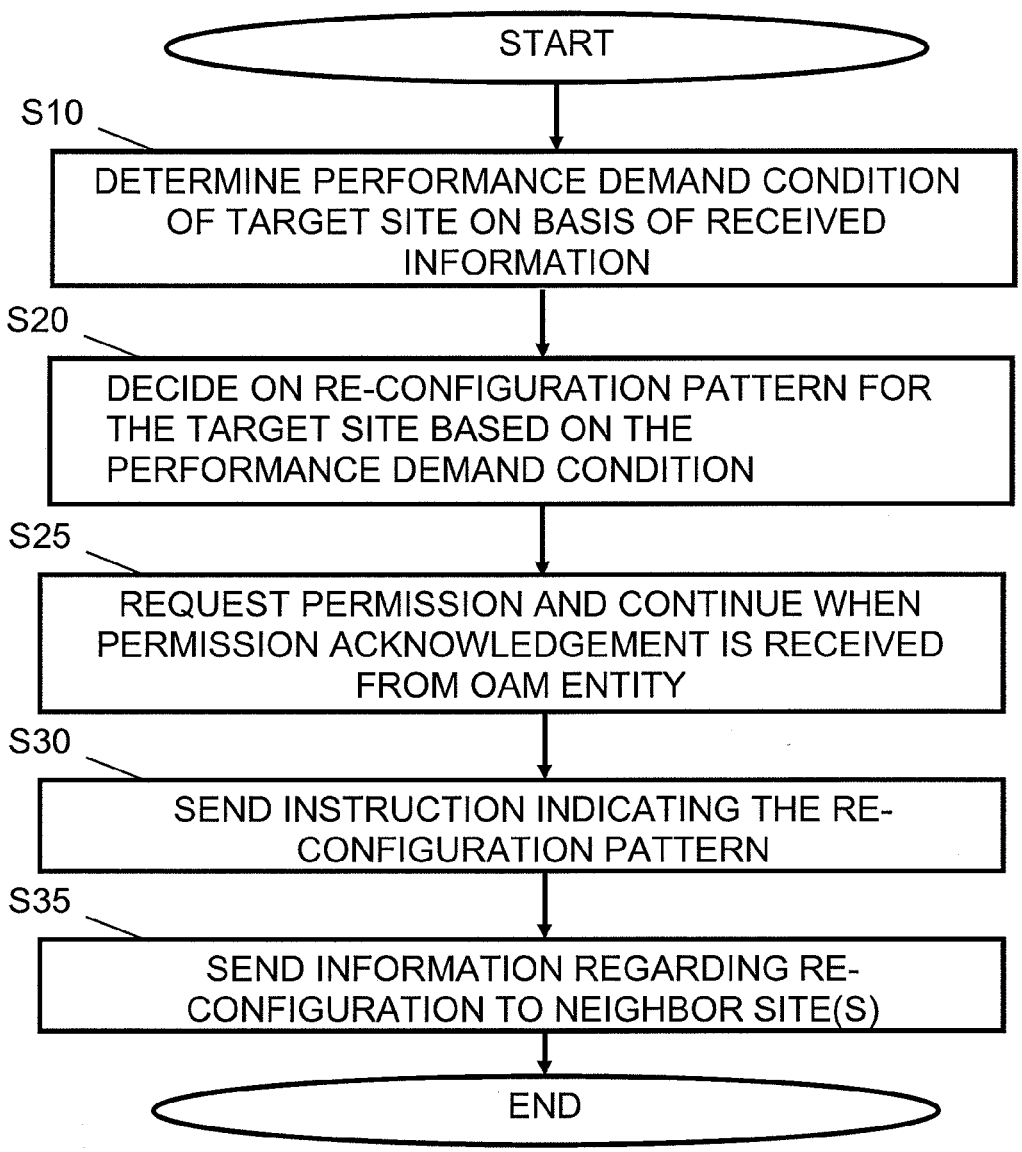
FIG. 2 shows a flow chart illustrating a processing executed by a configuration control element according to an example of an embodiment of the invention.
Figure 3:
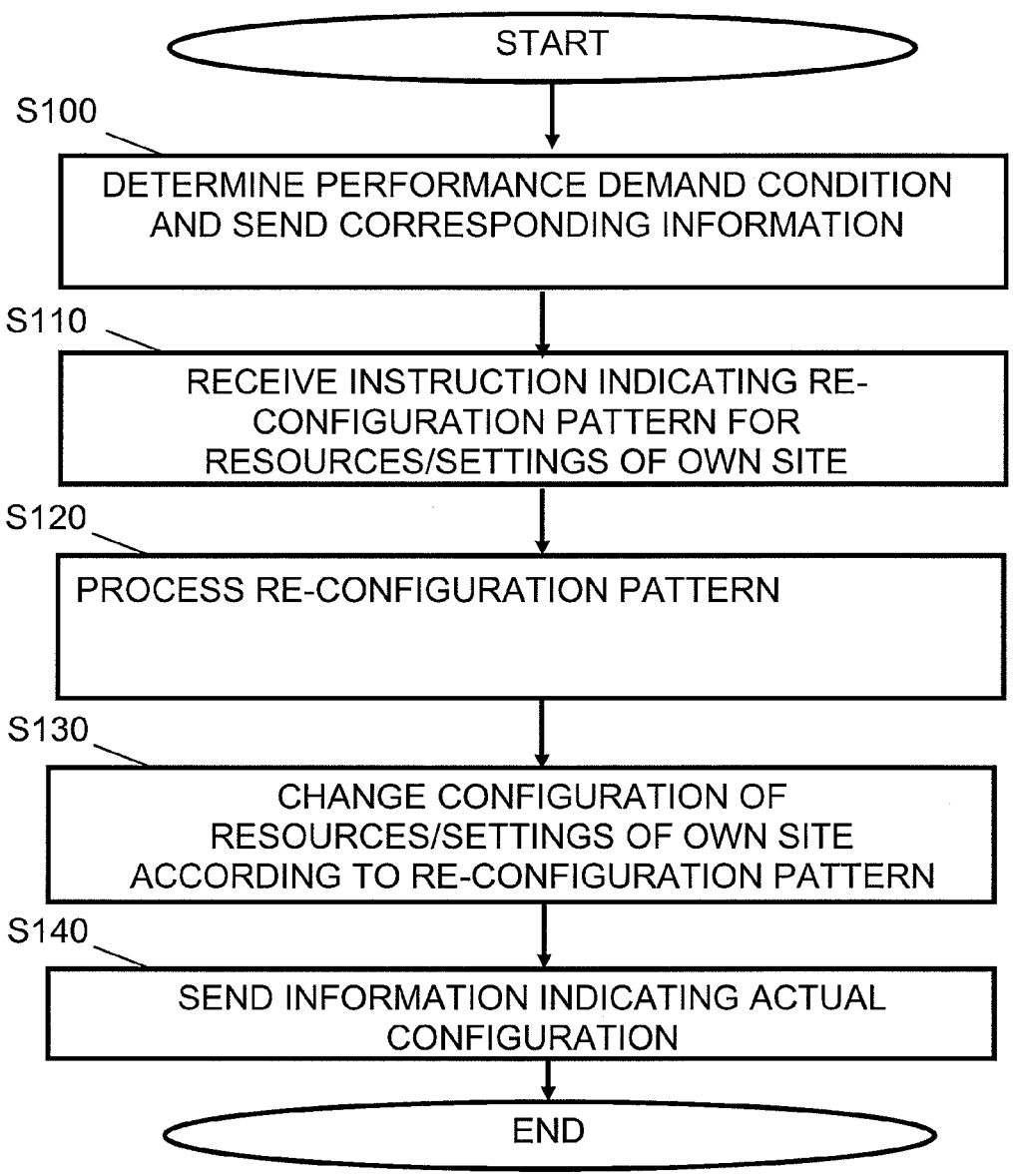
FIG. 3 shows a flow chart illustrating a processing executed by an access network element representing a target site according to an example of an embodiment of the invention.
Figure 4:
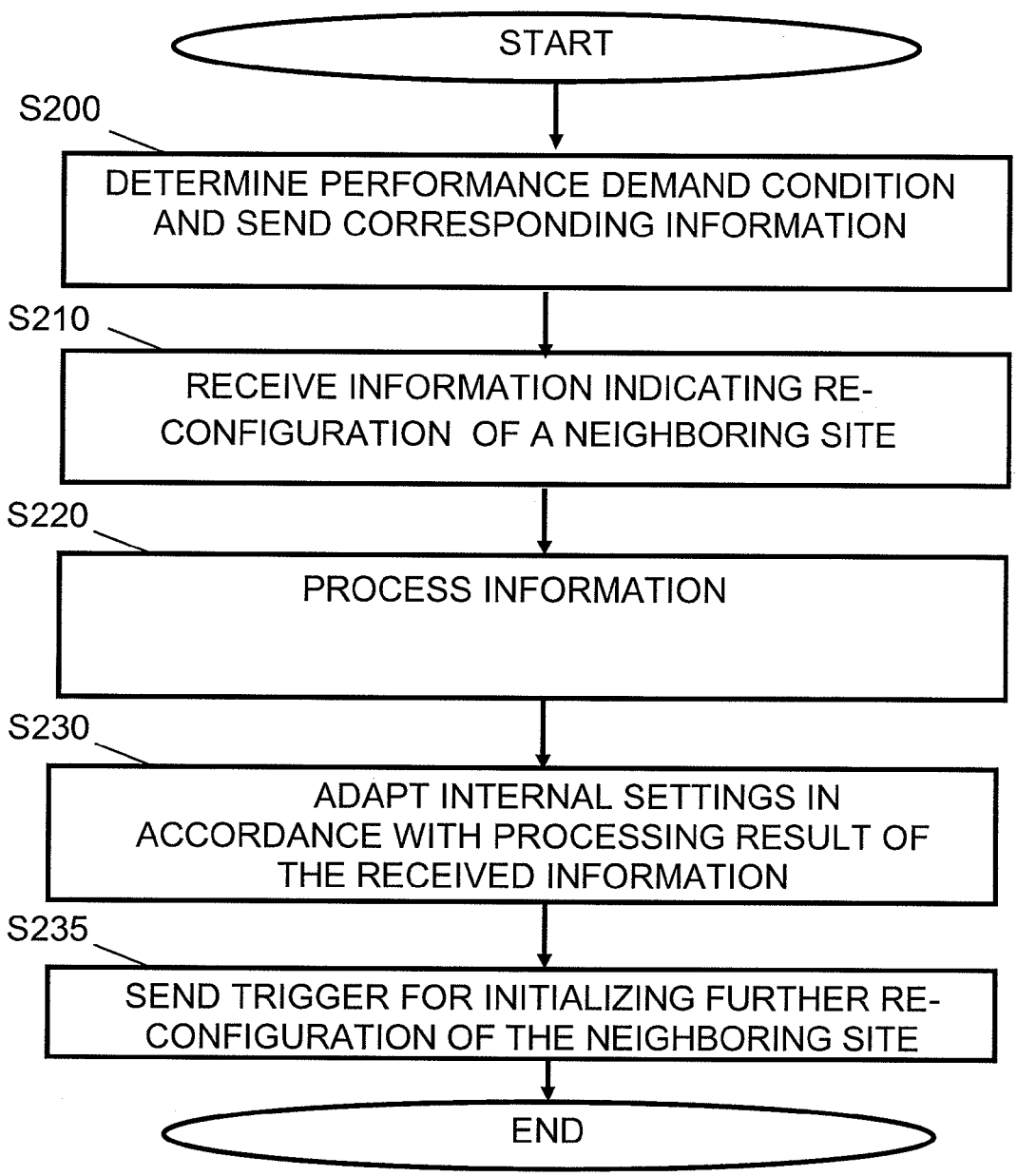
FIG. 4 shows a flow chart illustrating a processing executed by an access network element representing a neighboring site according to an example of an embodiment of the invention.

In the following, FIGS. 2 to 4 showing flow charts the procedures executed by the SON entity 10 representing the configuration control element, the access network element 20 representing the target site A and the access network element 30 representing the neighboring site B are explained.

As shown in FIG. 2, a procedure implemented in the configuration control element or SON entity 10 comprises a step S10 where the performance demand condition of the target site is determined on the basis of information received from the target site A and optionally from the neighboring site(s) B (as shown in FIG. 1 with step 1). Then, a re-configuration pattern for the target site A is decided in step S20 on the basis of the performance demand condition. This means, as described in connection with FIG. 1, the information from the target site A (and the neighboring site B), such as the load information, triggers a decision in the SON entity 10 to instruct a change of the configuration of the target site A's resources and settings.

In step S25, which may be optionally executed, a permission to effect the re-configuration is requested from a OAM entity so as to consider also circumstances not known to the SON entity 10 or the target site A, according to step 2 in FIG. 1. When the permission is received (according to step 3 of FIG. 1), the procedure is continued. Otherwise, when no permission acknowledgement is received, the re-configuration procedure is stopped (not shown in FIG. 2).

In step S30, an instruction indicating the decided re-configuration pattern is transmitted to the target site A (access network element 20), as shown in FIG. 1 with step 4.

In step S35, if to be executed, the SON entity 10 sends information regarding the re-configuration and corresponding parameters to the neighboring site B (according to step 5 of FIG. 1). It is to be noted that the re-configuration information may be received beforehand from the target site A (not shown in FIG. 2). Thereafter, the re-configuration procedure is ended.

As shown in FIG. 3, a procedure implemented in the target site A (access network element 20) comprises a step S100 where the performance demand condition of the target site A is determined (or measured). The determined performance demand condition, such as the load information, is sent as a corresponding information to the SON entity 10 (as shown in FIG. 1 with step 1).

Then, in step S110, an instruction indicating re-configuration pattern is received from the SON entity 10 (according to step 4 in FIG. 1). The instruction and/or re-configuration pattern is processed in step 120 so as to determine which resources and/or settings are to be changed. In step S130, the corresponding changes in the target site A's resources are effected based on the processing results of step S120.

In step S140, information indicating the actual configuration of the target site A's resources and settings are sent to the SON entity 10 and/or to neighboring site(s) B. Thereafter, the re-configuration procedure is ended.

As shown in FIG. 4, a procedure implemented in the neighboring site B (access network element 30) comprises a step S200 where the performance demand condition of the neighboring site B is determined (or measured). The determined performance demand condition, such as the load information, is sent as a corresponding information to the SON entity 10 (as shown in FIG. 1 with step 1).

Then, in step S210, information indicating the actual configuration of the target site A's resources and settings are received (either from the SON entity 10 or the target site A), as shown in FIG. 1 in step 5. The information regarding the re-configuration of the target site A is processed in step 220 so as to determine which resources and/or settings are changed and which impacts this has to the situation for the neighboring site B. Then, in step S230, internal settings of the site B are adapted based on the processing results of step S220.

Step S235 is executed in case the neighboring site B determines that there are circumstances requiring a further reconfiguration of the changed target site A's configuration, for example due to changed load situation.

Then, a trigger signal is sent to the SON entity 10 for initializing the change of the resources and settings of the target site A, for example to the initial values.

Thereafter, the re-configuration procedure is ended.

Figure 5:
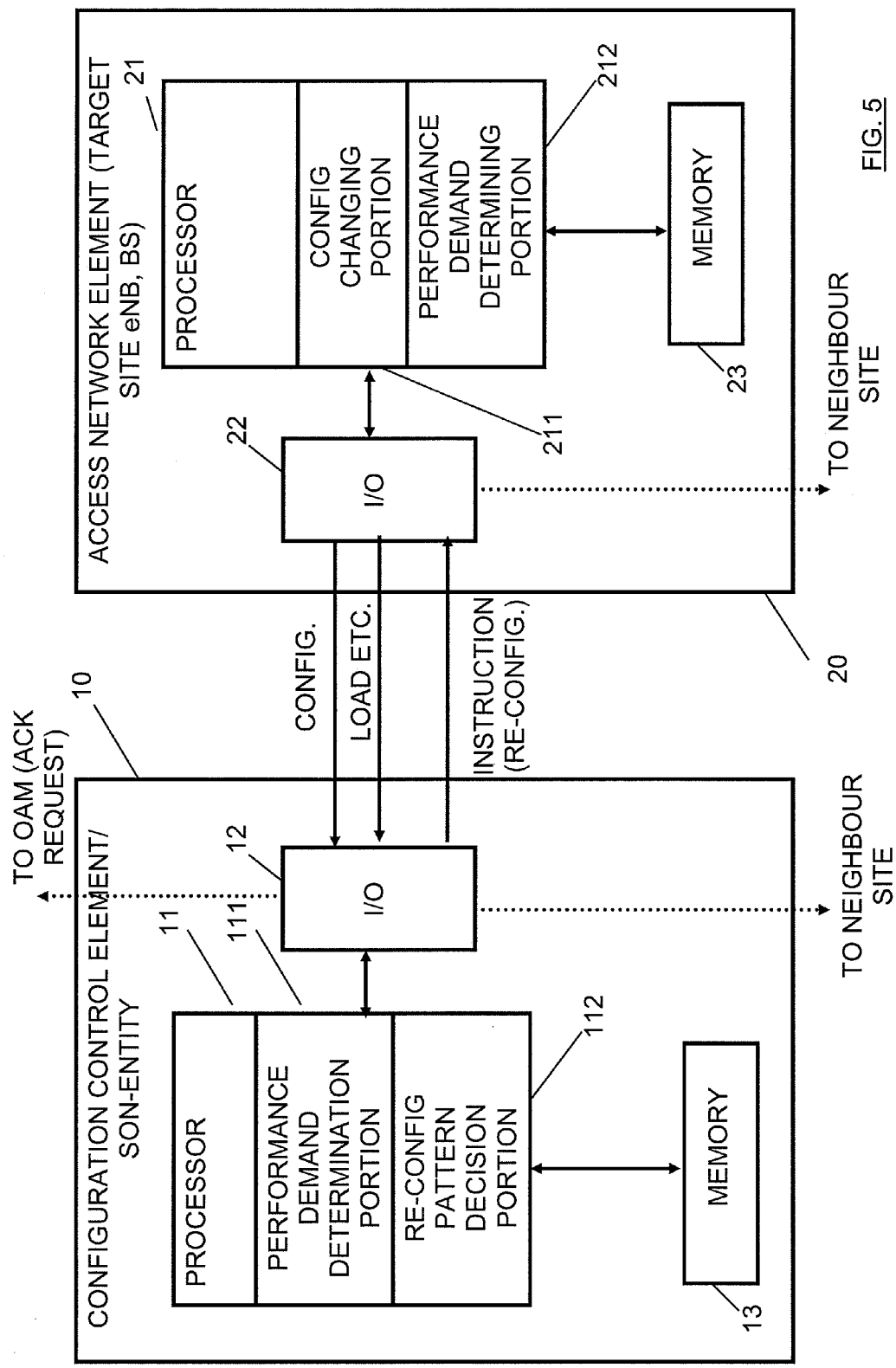
FIG. 5 shows a block circuit diagram illustrating a configuration control element and a target site according to an example of an embodiment of the invention.
Figure 6:
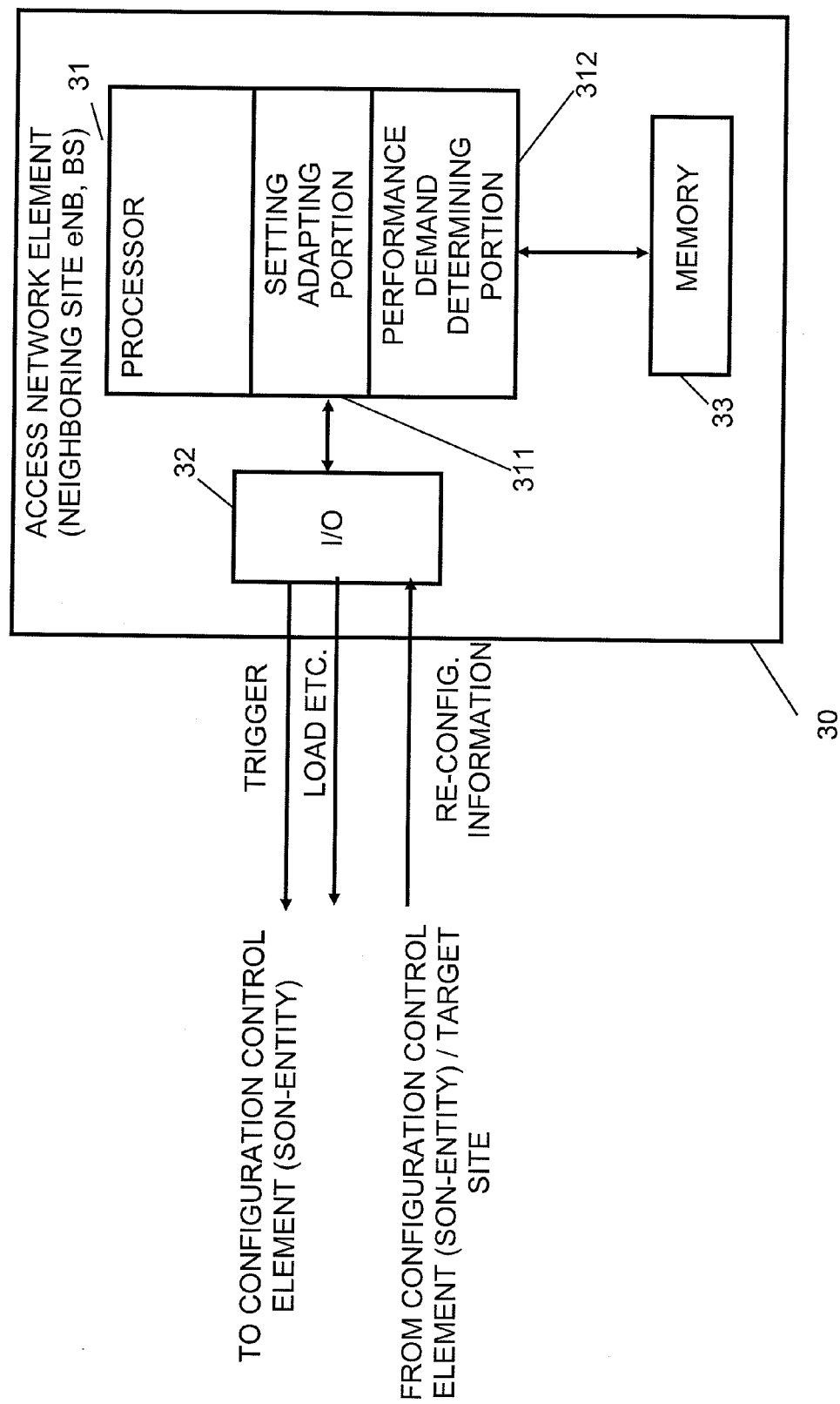
FIG. 6 shows a block circuit diagram illustrating a neighboring site according to an example of an embodiment of the invention.

In FIGS. 5 and 6, examples of a structure of the configuration control element (the SON entity 10), the target site A (access network element 20) and the neighboring site B (access network element 30) are described.

According to FIG. 5, the configuration control element or SON entity 10 comprises several portions and members. It is to be noted that the structure of the configuration control element 10 depicted in FIG. 5 is simplified in order to show only those parts useful for understanding embodiments of the present invention. As known to those skilled in the art, a SON entity may comprise several other elements or functions not shown herein. The configuration control element 10 may comprise a processor portion 11, such as a CPU or the like, an input/output (I/O) portion 12 representing an interface to other elements shown, for example, in FIG. 1, and comprising, for example, transceiver elements for an air or wire interface, for example, and a memory portion 13 in which, amongst others, data can buffered. The I/O portion 12 is connected to the processor 11 and forwards data/signaling received from the other network elements (for example load information, configuration information and the like) to the processor 11 and forwards data/signaling received from the processor 11 to the network elements, such as the access network element (for example the instruction indicating the re-configuration pattern). The I/O portion 12 may also be used for communication with the neighbor site B and the OAM entity 40 (as shown by dashed arrows in FIG. 5). The memory portion 13 is connected to the processor and stores/buffers data and programs used by the processor 11. The processor portion 11 comprises also a performance demand determination portion 111 which may be used for detecting the presence of a trigger for the re-configuration on the basis of the information received from the sites A and B, and a re-configuration patter decision portion 112 which may be used for deciding on the re-configuration pattern for the target site A when the trigger is detected and for generating a corresponding instruction to be sent to the target site A.

Similar to the configuration control element 10, the access network element 20 (referred to also as the target site A and being, for example, an eNB or BS) also comprises several portions and members. It is to be noted that the structure of the access network element 20 depicted in FIG. 5 is also simplified in order to show only those parts useful for understanding embodiments of the present invention. As known to those skilled in the art, a corresponding access network element may comprise several other elements or functions not shown herein. The target site 20 may comprise a processor portion 21, such as a CPU or the like, an input/output (I/O) portion 22 representing an interface to the other network elements shown in FIG. 1, in particular to the configuration control element 10, and comprising, for example, transceiver elements for an air or wire interface, for example, and a memory portion 23 in which, amongst others, data can buffered. The I/O portion 22 is connected to the processor 21 and forwards data/signaling received from the configuration control element 10 to the processor 21 (for example the instruction indicating the re-configuration pattern) and forwards data/signaling received from the processor 21 to the configuration control element 10 (for example load information, configuration information and the like). The I/O portion 22 may also be used for communication with the neighbor site B (as shown by dashed arrows in FIG. 5). The memory portion 23 is connected to the processor 21 and stores/buffers data and programs used by the processor 21. The processor portion 21 comprises also a configuration changing portion 211 which may be used for effecting the change of the resources/settings in accordance with the received instruction, and a performance demand determination portion 212 which may be used for detecting the performance demand condition of the target site A.

It is to be noted that the SON entity 10 may be located centrally or locally at one site involved.

If the SON entity 10 is located in a central location, such as separately or in an element manager in LTE systems or an access network control element (not shown), signaling may take place on specific interfaces, for example an Itf-eB. Furthermore, information flow to and from the SON entity may also involve higher layers of OAM, such as network management system, which may then involve another interface type, such as an open interface of an Itf-N type.

On the other hand, in case of a decentralized location of the SON entity 10, for example in the access network element like an eNB, such as the target site 20 or the neighboring site 30, additionally a direct communication between the access network elements (e.g. the target site A and the neighboring site B) over an specified interface like an open X2 interface may be implemented.

In the above examples of the embodiments of the invention, cases are shown where the target site 20 and the neighboring site 30 are access network elements such as BS being on the same hierarchical level in the network. However, it is to be noted that the mechanisms according to the invention are also applicable in cases where the access network element such as the BS or eNB is connected to one or more relay nodes being on a lower hierarchical level. This represents a case of relay-enhanced cell, wherein the SON entity could be in the BS, whereas the re-configuration takes place in the relay (which would then be the target site or cell). In other words, the target site and neighboring site(s) may not be on the same hierarchical level and/or be of identical type. In such an example, it is possible that the configuration control element (i.e. the SON entity 10) may be located in another site than the target site, where a re-configuration takes place. As a particular example for such a case, the re-configuration of a relay node may be controlled by its associated base station, wherein the SON entity may reside in the base station (the access network element), i.e. in an element representing also a neighboring site. In such a case, the communication between the SON entity and the target site (i.e. the relay node or nodes) takes place via the interfaces between the base station and the relay(s), while the communication between the SON entity and other neighboring sites may take place via interfaces between the access network elements of the network.

It is to be noted that the mechanisms and measures described above may also be used for achieving a so-called flat management architecture with direct access and open interface to the access network element like the eNB. For achieving such a flat management architecture, the SON entity 10 and the OAM entity 40 may be co-located in one physical node. Then, the signaling between this node and the target and neighboring sites may be correspondingly effected.

Regarding FIG. 6, a structure of a neighboring site B (access network element 30) is shown. Similar to the access network element 20, the access network element 30 (i.e. the neighboring site B which is, for example, an eNB or BS) also comprises several portions and members. It is to be noted that the structure of the access network element 30 depicted in FIG. 6 is simplified in order to show only those parts useful for understanding embodiments of the present invention. As known to those skilled in the art, a corresponding access network element may comprise several other elements or functions not shown herein. The neighboring site 30 may comprise a processor portion 31, such as a CPU or the like, an input/output (I/O) portion 32 representing an interface to the other network elements shown in FIG. 1, in particular to the configuration control element 10, and comprising, for example, transceiver elements for an air or wire interface, for example, and a memory portion 33 in which, amongst others, data can buffered. The I/O portion 32 is connected to the processor 31 and forwards data/signaling received from the configuration control element 10 (or from the target site A) to the processor 31 (for example the information indicating the re-configuration of the site A) and forwards data/signaling received from the processor 31 to the configuration control element 10 (for example load information, trigger signals and the like). The memory portion 33 is connected to the processor 31 and stores/buffers data and programs used by the processor 31. The processor portion 31 comprises also a settings adapting portion 311 which may be used for effecting the adjustment of the internal settings of the neighboring site B in accordance with the information of the re-configuration of the site A, and a performance demand determination portion 312 which may be used for detecting the performance demand condition of the neighboring site B. The performance demand determination portion 312 may also be used for detecting the requirement to send the trigger signal to the configuration control element 10 for initializing the further re-configuration of the site A.

It is to be further noted that in case two sectors of a cell are realized by beamforming using, for example, two identical antenna elements at proper spacing (lambda/2), then basically the small beamwidth is realized by giving identical signal, but with defined phase shift on the two antennas, while the full beamwidth is realized by just operating one antenna. This is in particular useful for the measures described in the examples of embodiments of the present invention since for the full beamwidth the other transmitter may be switched off, while for half beamwidth two "virtual antennas" may be generated by the two real ones. It is also possible to use the mechanism of the present invention in cases of more than two sectors and/or two antennas generating more than two cells, e.g. in a grid-of-beam manner.

It is to be further noted that even though the above embodiments are described in an LTE environment representing a future network architecture, the describes measures and procedures may also be implemented in communication systems using existing technologies, such as 3GPP based networks or the like. It is obvious for those skilled in the art that the involved parameters and procedures are to be adapted to the existing technology, interfaces and architecture.

As described above, there is provided a mechanism for controlling resources and/or settings of an access network element like a base station which allows an autonomous reconfiguration of, for example, the antenna configuration based on a set of performance indicators in a base station. The base station can reconfigure itself without the need of operator control so that during periods with low capacity demands the base station will reconfigure correspondingly, which may comprise a reduction of active cells by turning off the power for a part of the installed equipment.

It should be understood that the above description and accompanying figures are merely intended to illustrate the present invention by way of example only. The preferred embodiments of the present invention may thus vary within the scope of the attached claims.

The invention claimed is:

1. A method comprising: determining a performance demand condition of a target site of an access network element in an access network:
    deciding on a re-configuration antenna pattern for the target site for use in the access network based on the performance demand condition: and
    sending an instruction indicating the re-configuration antenna pattern to the target site.

2. The method according to claim 1, wherein the determining of the performance demand condition of the target site comprises acquiring information about at least one of a cell load statistic, overload and/or resource information of neighboring cells, overload and/or resource information of sectors of the target site, preset time scheduling information, and predetermined event trigger information, and processing the acquired information for determining presence of a trigger condition for re-configuring the target site.

3. The method according to claim 1, wherein the deciding on a re-configuration pattern comprises selecting from a plurality of preset re-configuration patterns, wherein the plurality of preset re-configuration patterns comprises at least one pattern for a high load state and at least one pattern for a low load state.

4. The method according to claim 1, wherein the deciding on a re-configuration pattern comprises generating parameters indicating at least one of
   setting at least one power amplifier of the target site to be turned off/on,
   re-configuring antenna patterns of the target site,
   adjusting azimuth beampatterns of the target site,
   setting sectors of the target site to be turned off/on,
   setting antennas of the target site to be turned off/on, and
   setting a sweep operation of an azimuth beampattern for a time multiplex coverage of the target site.

5. The method according to claim 4, wherein the deciding on a re-configuration pattern further comprises generating parameters indicating at least one of setting a gradual reduction of a transmit power of dedicated sectors before executing another re-configuration, and adjusting a transmit power of dedicated sectors after executing the re-configuration.

6. The method according to claim 1, further comprising requesting permission for a re-configuration of the target site from a network control element, wherein the sending of the instruction indicating the re-configuration pattern for the target site is performed when an acknowledgement for the requesting of the permission is received.

7. The method according to claim 1, further comprising receiving information about an actual configuration of the target site.

8. The method according to claim 1, further comprising
   sending information about the re-configuration of the target site to another access network site, wherein the another access network site is a neighboring site to the target site.

9. The method according to claim 7, wherein the information comprises at least one of
   an indication of deactivated cells or sectors of the target site,
   information indicating an adjusted capacity of the target site after the re-configuration,
   information about non-covered areas related to the target site, and
   information regarding a sweep operation of an azimuth beampattern for a time multiplex coverage of the target site.

10. The method according to claim 1, wherein the method is implementable in a self-organizing network entity.

11. The method according to claim 1, wherein the method is implementable in at least one of the target site and a neighboring site.

12. The method according to claim 1, wherein the method is implementable in an access network control element.

13. The method according to claim 1, wherein the method is implementable in a network element for operation, administration and maintenance.

14. An apparatus comprising:
    at least one processor;
    memory storing a program of instructions;
    wherein the memory storing the program of instructions is configured to, with the at least one processor, cause the apparatus to at least:
      determine a performance demand condition of a target site of an access network element in an access network:
      decide on a re-configuration antenna pattern for the target site for use in the access network based on the performance demand condition: and
      configure, for transmission to the target site, an instruction indicating the re-configuration antenna pattern.

15. The apparatus according to claim 14, wherein the determination further comprises
    acquiring information about at least one of a cell load statistic, overload and/or resource information of neighboring cells, overload and/or resource information of sectors of the target site, preset time scheduling information, and predetermined event trigger information, and process the acquired information for determining presence of a trigger condition for re-configuring the target site.

16. The apparatus according to claim 14, wherein deciding further comprises selecting from a plurality of preset re-configuration patterns, wherein the plurality of preset re-configuration patterns comprises at least one pattern for a high load state and at least one pattern for a low load state.

17. The apparatus according to claim 14, wherein deciding further comprises generating parameters indicating at least one of
    setting at least one power amplifier of the target site to be turned off/on,
    re-configuring antenna patterns of the target site,
    adjust azimuth beampatterns of the target site,
    setting sectors of the target site to be turned off/on,
    setting antennas of the target site to be turned off/on, and
    setting a sweep operation of an azimuth beampattern for a time multiplex coverage of the target site.

18. The apparatus according to claim 17, wherein deciding further comprises generating further parameters indicating at least one of setting a gradual reduction of a transmit power of dedicated sectors before executing another reconfiguration, and adjusting a transmit power of dedicated sectors after executing the re-configuration.

19. The apparatus according to claim 14, wherein the apparatus is further caused to
    request permission for a re-configuration of the target site from a network control element,
    send the instruction indicating the re-configuration pattern to the target site when an acknowledgement of the requesting of the permission is received.

20. The apparatus according to claim 14,
    wherein the apparatus is further caused to receive information about an actual configuration of the target site.

21. The apparatus according to claim 14, further comprising a transmitter configured to send information about the re-configuration of the target site to another access network site, wherein the another access network site is a neighboring site to the target site.

22. The apparatus according to claim 20, wherein the information comprises at least one of
    an indication of deactivated cells or sectors of the target site,
    information indicating an adjusted capacity of the target site after the re-configuration,
    information about non-covered areas related to the target site, and
    information regarding a sweep operation of an azimuth beampattern for a time multiplex coverage of the target site.

23. The apparatus according to claim 14, wherein the apparatus is comprised in a self-organizing network entity.

24. The apparatus according to claim 14, wherein the apparatus is comprised in at least one of the target site and a neighboring site.

25. The apparatus according to claim 14, wherein the apparatus is comprised in an access network control element.

26. The apparatus according to claim 14, wherein the apparatus is comprised in a network element for operation, administration and maintenance.

27. A method comprising:
receiving an instruction indicating a re-configuration antenna pattern:
processing the re-configuration antenna pattern: and
changing a configuration of resources according to the processing result of the re-configuration antenna pattern.

28. The method according to claim 27, further comprising transmitting configuration information indicating a current configuration to a configuration control element, said configuration information comprising at least one of antenna configuration information, sector configuration information, a number of sectors, a cell identification, and a transmit power value for reference signal and data transmission.

29. The method according to claim 27, further comprising transmitting performance demand information related to a performance demand condition to a configuration control element, said performance demand information comprising at least one of a cell load statistic, overload and/or resource information of sectors, and predetermined event trigger information.

30. The method according to claim 27, wherein the processing of the re-configuration pattern comprises detecting of changes of parameters of resources from the re-configuration pattern, wherein the re-configuration pattern comprises a pattern for a high load state or a pattern for a low load state.

31. The method according to claim 30, wherein the processing of the re-configuration pattern further comprises acquiring parameters indicating at least one of
setting at least one power amplifier to be turned off/on,
re-configuring antenna patterns,
adjusting azimuth beampatterns,
setting sectors to be turned off/on,
setting antennas to be turned off/on, and
setting a sweep operation of an azimuth beampattern for a time multiplex coverage.

32. The method according to claim 31, wherein the processing of the re-configuration pattern further comprises acquiring parameters indicating at least one of
setting a gradual reduction of a transmit power of dedicated sectors before executing another reconfiguration, and
adjusting a transmit power of dedicated sectors after executing the re-configuration.

33. The method according to claim 27, further comprising sending information about an actual configuration after performing the re-configuration to at least one of a configuration control element and a neighboring access network element.

34. The method according to claim 33, wherein the information comprises at least one of
an indication of deactivated cells or sectors,
information indicating an adjusted capacity after the re-configuration,
information about non-covered areas, and
information regarding a sweep operation of an azimuth beampattern for a time multiplex coverage.

35. The method according to claim 27, wherein the method is implementable in an access network element.

36. An apparatus comprising:
at least one processor;
memory storing a program of instructions;
wherein the memory storing the program of instructions is configured to, with the at least one processor, cause the apparatus to at least:
receive an instruction indicating a re-configuration antenna pattern:
process the re-configuration antenna pattern: and
change a configuration of resources according to the processing result of the reconfiguration antenna pattern.

37. The apparatus according to claim 36, further comprising
a transmitter configured to transmit configuration information indicating a current configuration to a configuration control element, said configuration information comprising at least one of antenna configuration information, sector configuration information, a number of sectors, a cell identification, and a transmit power value for reference signal and data transmission.

38. The apparatus according to claim 36, further comprising
a second transmitter configured to transmit performance demand information related to a performance demand condition to a configuration control element, said performance demand information comprising at least one of a cell load statistic, overload and/or resource information of sectors, and predetermined event trigger information.

39. The apparatus according to claim 36, wherein the processor further comprises a detector configured to detect changes of parameters of resources from the re-configuration pattern, wherein the re-configuration pattern comprises a pattern for a high load state or a pattern for a low load state.

40. The apparatus according to claim 39, wherein the apparatus is further caused to acquire parameters indicating at least one of
setting at least one power amplifier to be turned off/on,
re-configuring antenna patterns,
adjusting azimuth beampatterns,
setting sectors to be turned off/on, setting antennas to be turned off/on, and
setting a sweep operation of an azimuth beampattern for a time multiplex coverage.

41. The apparatus according to claim 40, wherein acquiring parameters further comprises acquiring parameters indicating at least one of
setting a gradual reduction of a transmit power of dedicated sectors before executing another reconfiguration, and
adjusting a transmit power of dedicated sectors after executing the re-configuration.

42. The apparatus according to claim 36, further comprising
a transmitter configured to send information about an actual configuration after performing the re-configuration to at least one of a configuration control element and a neighboring access network element.

43. The apparatus according to claim 42, wherein the information comprises at least one of an indication of deactivated cells or sectors,
information indicating an adjusted capacity after the re-configuration,
information about non-covered areas, and
information regarding a sweep operation of an azimuth beampattern for a time multiplex coverage.

44. The apparatus according to claim 36, wherein the apparatus is comprised in an access network element.

45. A method comprising:
receiving information indicating a re-configuration of a target network site, wherein the information is received at a neighboring site to the target site;
processing the information: and
adapting an internal setting of an element of the neighboring site in accordance with the processing result of the received information.

46. The method according to claim 45, further comprising receiving information about the re-configuration from at least one of a configuration control element and a neighboring access network element.

47. The method according to claim 45, wherein the information comprises at least one of an indication of deactivated cells or sectors,
information indicating an adjusted capacity after the re-configuration,
information about non-covered areas, and information regarding a sweep operation of an azimuth beampattern for a time multiplex coverage.

48. The method according to claim 45, wherein the adapting of settings comprises at least one of
updating a neighbor cell list,
adjusting of at least one of handover and load balancing parameters, and
adjusting of paging procedure settings.

49. The method according to claim 45, further comprising transmitting performance demand information related to a performance demand condition to a configuration control element, said performance demand information comprising at least one of a cell load statistic, overload and/or resource information of sectors, and predetermined event trigger information.

50. The method according to claim 45, further comprising transmitting a trigger signal for initializing a further re-configuration of the neighboring site for which the information indicating the re-configuration was received.

51. The method according to claim 45, wherein the method is implementable in an access network element.

52. Apparatus comprising:
at least one processor;
memory storing a program of instructions;
wherein the memory storing the program of instructions is configured to, with the at least one processor, cause the apparatus to at least:
receive information indicating a re-configuration of a target network site, wherein the information is received at a neighboring site to the target site;
process the information, and
adapt an internal setting of an element of the neighboring site in accordance with the processing result of the received information.

53. The apparatus according to claim 52, receiving information about the reconfiguration comprises receiving information from at least one of a configuration control element and a neighboring access network element.

54. The apparatus according to claim 52, wherein the information comprises at least one of an indication of deactivated cells or sectors,
information indicating an adjusted capacity after the re-configuration,
information about non-covered areas, and
information regarding a sweep operation of an azimuth beampattern for a time multiplex coverage.

55. The apparatus according to claim 52, wherein adapting settings is comprises at least one of
updating a neighbor cell list,
adjusting of at least one of handover and load balancing parameters, and
adjusting of paging procedure settings.

56. The apparatus according to claim 52, further comprising
a transmitter configured to transmit performance demand information related to a performance demand condition to a configuration control element, said performance demand information comprising at least one of a cell load statistic, overload and/or resource information of sectors, and predetermined event trigger information.

57. The apparatus according to claim 52, further comprising a second transmitter configured to transmit a trigger signal for initializing a further re-configuration of the neighboring site for which the information indicating the re-configuration was received.

58. The apparatus according to claim 52, wherein the apparatus is comprised in an access network element.

59. An apparatus comprising:
determining means for determining a performance demand condition of a target site of an access network element in an access network:
deciding means for deciding on a re-configuration antenna pattern for the target site for use in the access network based on the performance demand condition: and
sending means for sending an instruction indicating the re-configuration antenna pattern to the target site.

60. An apparatus comprising:
receiving means for receiving an instruction indicating a re-configuration antenna pattern:
processing means for processing the re-configuration antenna pattern: and
changing means for changing a configuration of resources according to the processing result of the reconfiguration antenna pattern.

61. An apparatus comprising:
receiving means for receiving information indicating a re-configuration of a target network site, wherein the information is received at a neighboring site to the target site;
processing means for processing the information: and
adapting means for adapting an internal setting of an element of the neighboring site in accordance with the processing result of the received information.

62. A computer program product for a computer embodied on a non-transitory computer-readable storage medium, comprising software code portions execution of which by a processor configures an apparatus to perform the steps of claim 1.

63. A computer program product according to claim 62, wherein said computer program product comprises a computer-readable medium on which said software code portions are stored.

64. A computer program product according to claim 62, wherein said computer program product is directly loadable into internal memory of a computer.

* * * * *